(12) United States Patent
Basu et al.

(10) Patent No.: US 6,857,047 B2
(45) Date of Patent: Feb. 15, 2005

(54) MEMORY COMPRESSION FOR COMPUTER SYSTEMS

(75) Inventors: Sujoy Basu, Mountain View, CA (US); Sumit Roy, Menlo Park, CA (US); Rajendra Kumar, Los Altos, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 219 days.

(21) Appl. No.: 10/167,358

(22) Filed: Jun. 10, 2002

(65) Prior Publication Data

US 2003/0229761 A1 Dec. 11, 2003

(51) Int. Cl.[7] .............................................. G06F 12/00
(52) U.S. Cl. ........................ 711/129; 711/170; 707/101
(58) Field of Search ............................. 711/3, 129, 134, 711/144, 170, 202; 707/101

(56) References Cited

U.S. PATENT DOCUMENTS

| | | | | |
|---|---|---|---|---|
| 5,490,260 A | * | 2/1996 | Miller et al. ................. | 711/100 |
| 5,943,421 A | | 8/1999 | Grabon | |
| 6,032,148 A | * | 2/2000 | Wilkes ......................... | 707/101 |
| 6,324,621 B2 | * | 11/2001 | Singh et al. ................. | 711/129 |
| 6,370,631 B1 | * | 4/2002 | Dye ............................ | 711/170 |
| 6,523,102 B1 | * | 2/2003 | Dye et al. ................... | 711/170 |
| 6,557,083 B1 | * | 4/2003 | Sperber et al. ............. | 711/144 |
| 6,581,131 B2 | * | 6/2003 | Vondran, Jr. ................ | 711/3 |
| 6,658,549 B2 | * | 12/2003 | Wilson et al. ............... | 711/202 |

* cited by examiner

Primary Examiner—Nasser Moazzami

(57) ABSTRACT

A computer system is provided including a processor, a persistent storage device, and a main memory connected to the processor and the persistent storage device. The main memory includes a compressed cache for storing data retrieved from the persistent storage device after compression and an operating system. The operating system includes a plurality of interconnected software modules for accessing the persistent storage device and a filter driver interconnected between two of the plurality of software modules for managing memory capacity of the compressed cache and the buffer cache.

24 Claims, 5 Drawing Sheets

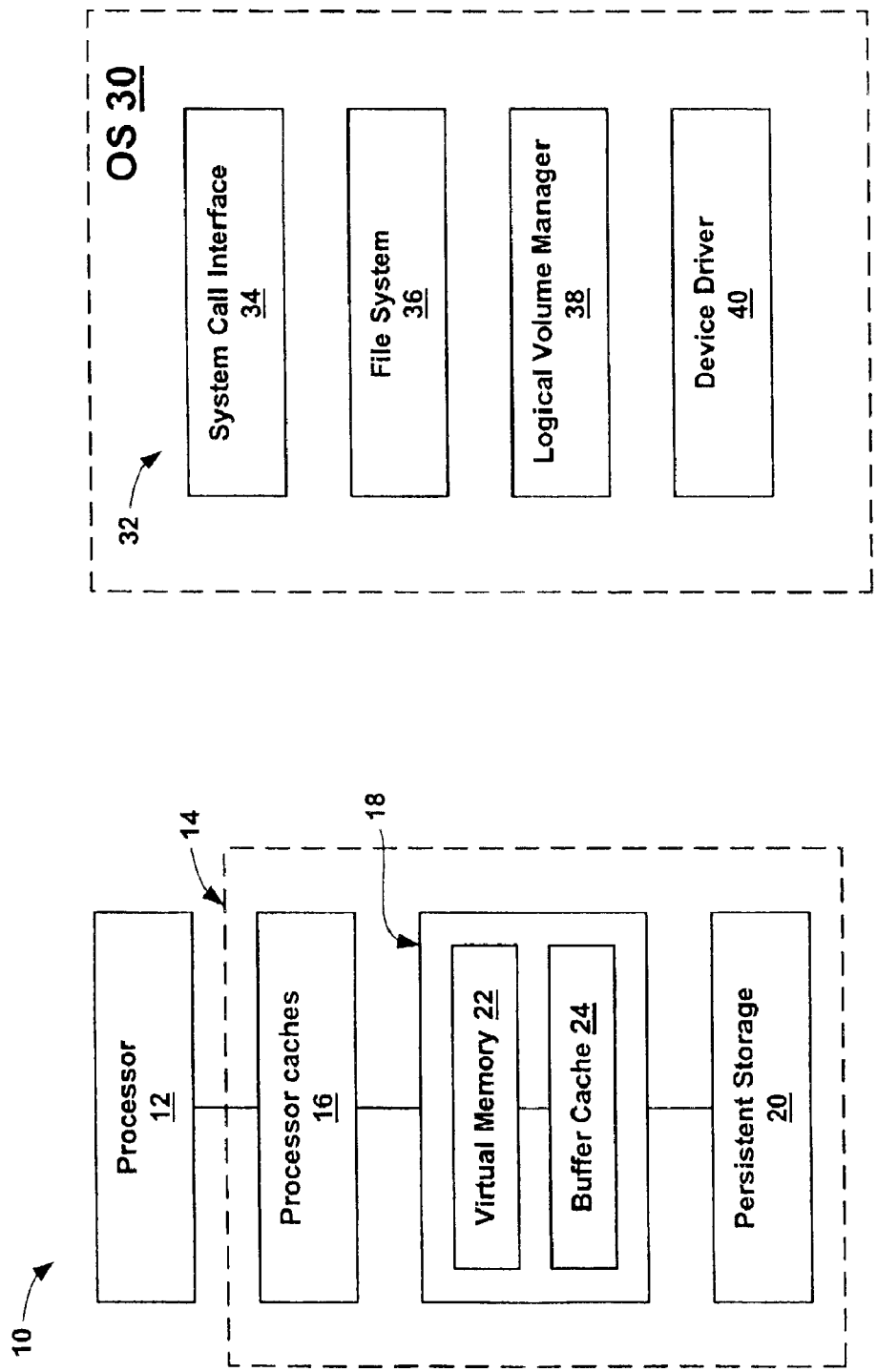

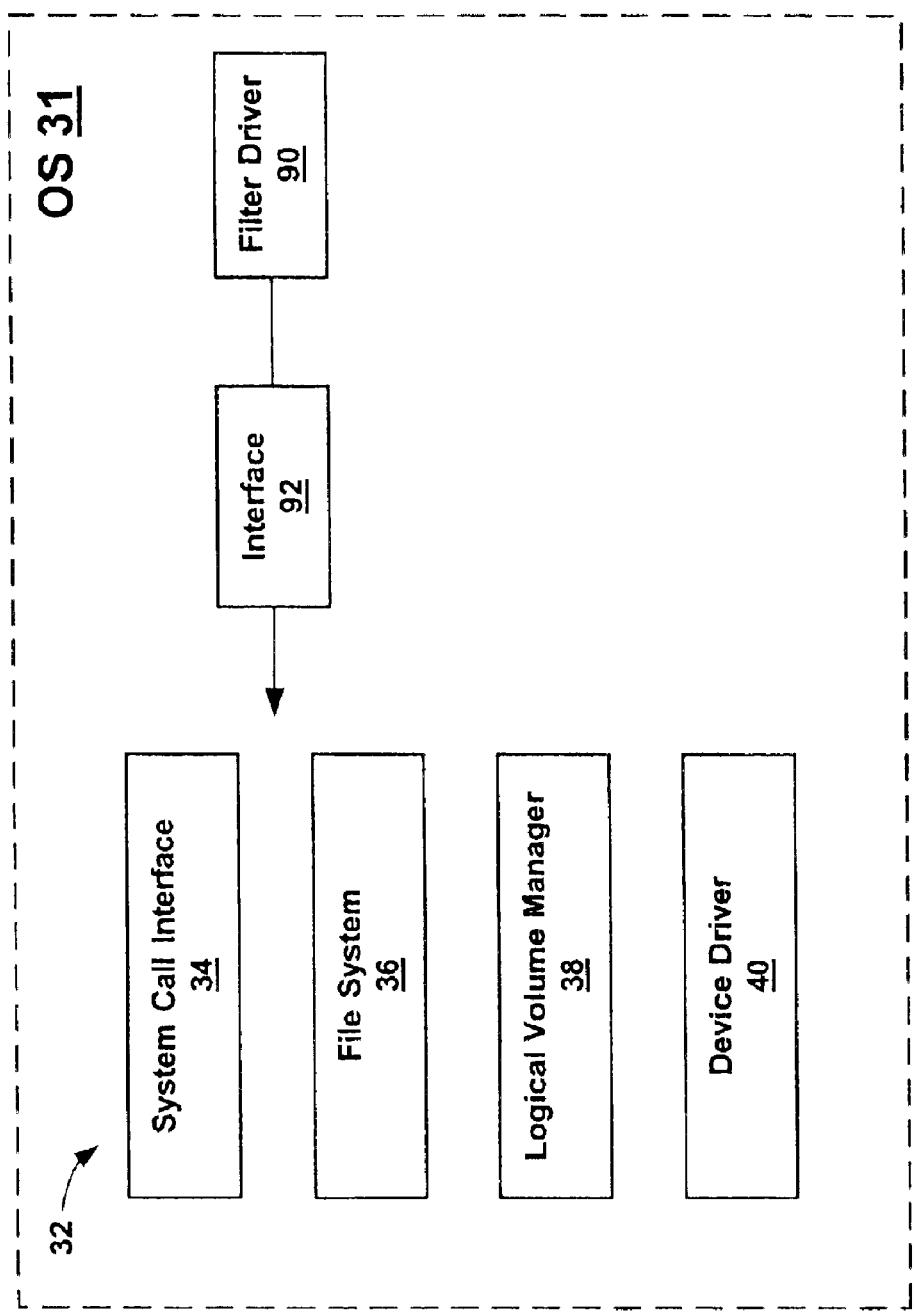

MEMORY COMPRESSION FOR COMPUTER SYSTEMS

BACKGROUND

1. Technical Field

The present invention relates generally to computer systems and more particularly to memory compression in computer systems.

2. Background Art

A computer system typically includes a processor and volatile memory, which stores data for computer programs (programs) being executed by the computer system. The volatile memory includes a main memory typically using dynamic random-access memory (DRAM) technology. The volatile memory might additionally include caches, typically using static random-access memory (SRAM) technology. The computer system also includes one or more persistent storage devices, such as hard disks, optical storage disks, magnetic tape drives, etc., which have high memory storage capacities.

In operation, a computer program reads and/or writes data stored in the persistent storage devices using an Operating System (OS) running on the computer system. The OS invokes appropriate software modules to identify the locations on the persistent storage device where data being accessed is stored. Since access to the persistent storage device is very slow, the OS reads data in large units, known as "data blocks", and stores them in the main memory. The part of the main memory reserved by the OS for storing these data blocks is known as "buffer cache". The OS then passes the requested part of the data to the program by copying it into memory spaces of the computer program. The computer program then performs its read and write operations on the data in the main memory. If the computer program subsequently accesses data items in the same data block that were fetched earlier from the persistent storage device and that are still present in the buffer cache, the OS can provide these data items very quickly when compared to having to access the persistent storage device.

There are two typical approaches in which the buffer cache can identify the data blocks it stores. The first approach involves using the location of the data blocks on the persistent storage device, such as the physical addresses on a hard disk. The second approach involves using an abstraction provided by a file system. In this case, the identity of the data blocks will be logical addresses, namely the offset of the data blocks from the beginning of the file system.

The buffer cache has limited storage capacity compared to the large amounts of data that the computer programs can operate on for two main reasons. First, the buffer cache is part of the main memory, which is more expensive and hence has less storage capacity available than the persistent storage device. Second, the OS allocates only a part of the main memory to the buffer cache. Therefore, when working with large amounts of data, a program often finds that the data blocks it needs to read or write are not present in the buffer cache. This occurrence is referred to as a "miss" in the buffer cache as opposed to a "hit" when the data block is actually present. The miss forces the OS to temporarily stall the program while the data blocks are brought into the buffer cache from the persistent storage device.

Since the buffer cache contains only a small amount of storage capacity compared to the amount of data in the persistent storage device that will be accessed by the program, the buffer cache often runs out of storage space. Therefore, a replacement algorithm must be run to decide which data blocks in the buffer cache must be replaced to bring in the required data blocks from the persistent storage device. A simple policy for replacement of data blocks could be replacing the least-recently-used data. Some of the data blocks selected for replacement might contain data changes written by the program. Hence, they must be written back to the persistent storage device before they are replaced. These data blocks cannot be used for reading data from the persistent storage device until the changed data is written out first. This will delay the execution of the program further. To avoid this scenario, the OS periodically selects data blocks containing data written into by the program and schedules a single write operation to flush their data out to the persistent storage device. This allows the subsequent selection of these data blocks by the replacement algorithm without having to wait for the data to be written out. In most cases, however, the program will be delayed because it needs to wait for the data it requires to be read from the persistent storage device.

It should be noted that the latency of accessing a persistent-storage device, such as a hard disk, may be several orders of magnitude more than that of accessing memory such as the main memory or the buffer cache. With current technology, a hard-disk access might have a latency of several milliseconds, while a memory (main memory or buffer cache) access may take only several tens of nanoseconds. To hide the latency of accessing the persistent storage device, the OS can schedule some other task to run on the processor. However, this may not be possible for computer systems dedicated to one main task, such as computationally demanding computer simulations. The latency can be minimized if the access pattern can be predicted, allowing the OS to schedule the transfer of data blocks from the persistent storage device into buffer cache ahead of time. However, such prediction is not always successful.

Thus, programs run on computer systems have performance problems when accessing large amount of data stored on persistent storage devices because the access to persistent storage devices are much slower than primary storage devices such as the main memory. It is not always desirable to add extra memory due to factors such as cost or limitations imposed by the physical system design. The lack of adequate main memory can severely degrade the performance of these programs.

One prior solution for speeding up access to data stored on persistent storage devices involves modifying the OS to improve the performance of the buffer cache. However, such solution is both costly and time-consuming.

Another prior solution involves adding DRAM or SRAM to the controller for caching data blocks in persistent storage devices like hard disks. Compression techniques are applied to the hard disk cache using hardware or software running on a coprocessor. However, accessing these persistent storage devices is still quite slow.

Thus, there is a need for a system and a method of operation that would improve the performance of computer systems, which execute programs that require accessing large amount of data from persistent storage devices. This has been a long-term need and solutions have long eluded those skilled in the art.

DISCLOSURE OF THE INVENTION

The present invention provides a computer system and a method of operation, which includes a processor, a persistent storage device, and a main memory connected to the processor and the persistent storage device. The main memory includes a compressed cache for storing data retrieved from the persistent storage device after compression and an operating system. The operating system includes a plurality of interconnected software modules for accessing the persistent storage device and a filter driver interconnected between two of the plurality of software modules for managing memory capacity of the compressed cache. This improves the performance of computer systems, which execute programs that require accessing large amount of data from persistent storage devices.

The above and additional advantages of the present invention will become apparent to those skilled in the art from a reading of the following detailed description when taken in conjunction with the accompanying drawings.

BRIEF DESCRIPTION OF THE DRAWINGS

FIG. 1 (PRIOR ART) is a schematic block diagram of a prior art computer system;

FIG. 2 (PRIOR ART) is a schematic block diagram of a portion of a prior art Operating System used by the computer system of FIG. 1 (PRIOR ART);

FIG. 5 is a schematic block diagram of an operating system of the computer system of FIG. 3 according to an embodiment of the present invention;

BEST MODES FOR CARRYING OUT THE INVENTION

Figure 4:
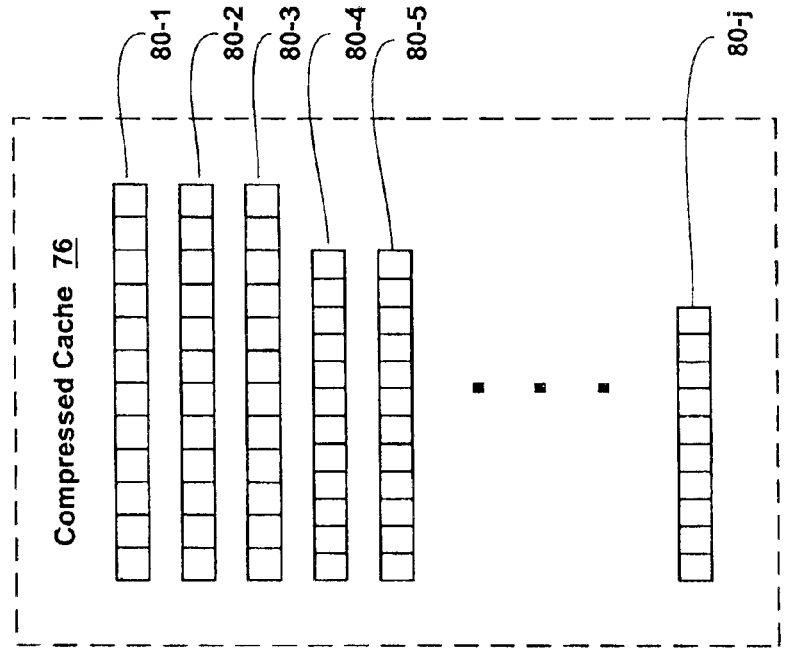
FIG. 4 is a schematic block diagram of a compressed cache according to an embodiment of the present invention.

The present invention uses a unique method to hide latency involved in accessing a persistent storage device such as a hard disk. In an embodiment of the present invention, a part of the main memory is allocated as a first buffer cache and a second buffer cache. The first buffer cache is regular cache and the second buffer cache is a "compressed cache" where data blocks are stored after compression. A software module ("filter driver") is introduced wherein the filter driver is invoked every time the operating system (OS) reads or writes from the persistent storage device. The invocation is possible since the filter driver can be plugged into the OS with an OS compatible interface. No modification to the OS is required according to an embodiment of the present invention.

Referring now to FIG. 1 (PRIOR ART), therein is shown a prior art computer system 10. The computer system 10 includes a processor 12 and a memory system 14 connected to the processor 12. The memory system 14 includes processor caches 16, a main memory 18 connected to the processor caches 16, and a persistent storage device 20 connected to the main memory 18.

The processor caches 16 typically include static random-access memory (SRAM) or other memory devices, which allow very fast accesses.

The main memory 18 includes a virtual memory 22 and a buffer cache 24.

The virtual memory 22 functions as temporary memory storage for computer programs that are being executed by the computer system 10. The buffer cache 24 is a portion of the main memory 18, which is reserved for storing data blocks retrieved from the persistent storage device 20.

The persistent storage device 20 may include memory systems such as one or more hard disks.

Referring now to FIG. 2 (PRIOR ART), therein is shown a portion of a prior art Operating System (OS) 30 used by the computer system 10. The OS 30 is the software that controls the allocation and usage of hardware resources such as memory, processor time, disk space, and peripheral devices. The OS 30 includes a software stack 32 for accessing the persistent storage device 20. The software stack 32 has a multi-layer structure and includes a number of software modules. The first software module is a system call interface layer 34. The system call interface layer 34 defines the Application Programming Interface (API) functions a program can use to work with various types of resources. The API is a set of routines used by an application program to direct the performance of procedures by the OS 30. The system call interface layer 34 for the file system 36 implements functions such as open, read, write, close, etc.

The second software module is a file system layer 36, which is one layer below the system call interface layer 34. The file system layer 36 is a portion of the OS 30 and implements the overall functionality in which files are named, stored, and organized. The file system layer 36 includes files, directories, folders, the implementation of the API functions specified in the system call interface layer 34, and the information needed to locate and access these items.

The third software module is a logical volume manager layer 38, which is one layer below the file system layer 36. The logical volume manager layer 38 takes multiple hard disks and can aggregate physical locations from the multiple hard disks to present an abstraction of a single sequence of storage locations.

The fourth software module is a device driver layer 40, which is one layer below the logical volume manager layer 38. The device driver layer 40 contains low-level, sector-oriented task instructions used to control the persistent storage devices 20.

Figure 3:
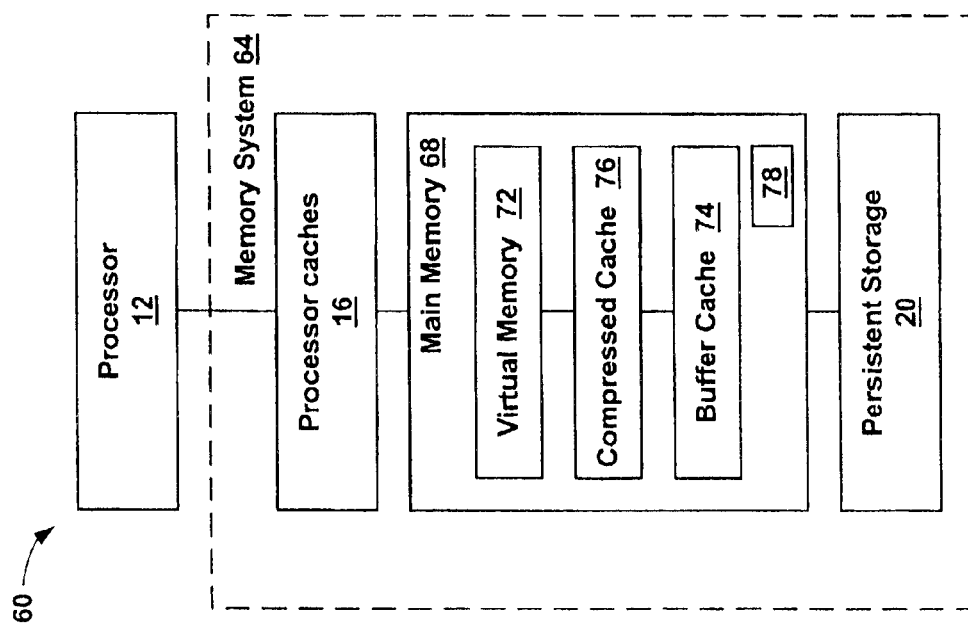
FIG. 3 is a schematic block diagram of a computer system according to an embodiment of the present invention.

Referring now to FIG. 3, therein is shown a schematic block diagram of a computer system 60 in accordance with an embodiment of the present invention. The nomenclatures and numbers in FIG. 3 are the same as in FIG. 1 (PRIOR ART) for the same elements.

The computer system 60 includes the processor 12, and a memory system 64 connected to the processor 12. The memory system 64 includes the processor caches 16, a main memory 68 connected to the processor caches 16, and the persistent storage device 20 connected to the main memory 68.

The main memory 68 includes a virtual memory 72, a buffer cache 74, a compressed cache 76, and a temporary buffer 78. The virtual memory 72 functions as temporary memory storage for computer programs that are being executed by an Operating System (OS 31 as shown in FIG. 5) used by the computer system 60. The buffer cache 74 is a portion of the main memory 68 for storing data blocks retrieved from the persistent storage device 20 without compression. The memory system 64, with the persistent storage device 20 excluded, is all considered to be non-persistent memory.

Compression and decompression algorithms, per se, are well known in the art and the present disclosure will allow those having ordinary skill in the art to understand their application in the present invention.

The compressed cache 76 is a second buffer cache formed by allocating a portion of the main memory 68. The compressed cache 76 stores the contents of the data blocks after compression. The compressed cache 76 forms another layer in the memory and storage hierarchy for holding data from the persistent storage devices 20.

The temporary buffer 78 is a portion in the main memory that is allocated on an as-needed basis for holding data temporarily when a certain algorithm is processed.

Referring to FIG. 4, therein is shown a schematic block diagram of the compressed cache 76 constructed in accordance with an embodiment of the present invention. The compressed cache 76 includes a number of memory spaces (buckets) 80-1 through 80-n (with only 80-1, 80-2, 80-3, 80-4, 80-5, and 80-j shown). Each of the buckets includes a number of bytes, such as 128 bytes. Each of the buckets 80-1 to 80-j does not have the same number of bytes. For example, each of buckets 80-1 through 80-3 has a memory space of m bytes, while each of buckets 80-4 through 80-5 has a memory space of n bytes. In this case, m and n are integers, and m is not equal to n.

Referring to FIG. 5, therein is shown a schematic block diagram of an operating system (OS) 31 of the computer system 60 in accordance with an embodiment of the present invention. The nomenclatures and numbers in FIG. 5 are the same as in FIG. 3 (PRIOR ART) for the same elements.

The OS 31 includes the software stack 32 for accessing the persistent storage device 20. The software stack 32 has a multi-layer structure and includes the following software modules: the system call interface layer 34, the file system layer 36 below the system call interface layer 34, the logical volume manager layer 38 below the file system layer 36, and the device driver layer 40 below the logical volume manager layer 38. The OS 31 also includes a filter driver 90.

In this embodiment, the filter driver 90 is a software module that is plugged into (operatively connected to) the OS 31 using an interface 92, which is compatible with the OS 31. The filter driver 90 may be plugged in between any two layers in the software stack 32, for example between the system call interface layer 34 and the file system layer 36 as shown. To the layer above it, the filter driver 90 presents the same interface as the layer below it so it is transparent in both directions for reads and writes.

When the OS 31 invokes a "read" operation to the persistent storage devices 20, the filter driver 90 searches the compressed cache 76 for the required data blocks. If the required data blocks are present in the compressed cache 76, the filter driver 90 decompresses the required data blocks, either with or without hardware assistance, and returns them to the software module of the OS 31 that called it. If the required data blocks are not present in the compressed cache 76, the filter driver 90 calls the software module that is below it in the OS 31, which eventually results in access to the persistent storage device 20. Since decompressing the required data blocks can be done much faster than accessing the same data blocks from the persistent storage device 20, the read operation takes less time. This translates into reduced total execution time for the computer program.

Initialization

During initialization, if the filter driver 90 is enabled, the filter driver 90 requests a certain amount of memory space (capacity) from the OS 31 based on configuration parameters provided.

This memory space, which forms the compressed cache 76, becomes another layer in the memory and storage hierarchy for holding data from the persistent storage devices 20.

The compressed cache 76 is then carved into a number of buckets such as buckets 80-1 to 80-j. Each of the buckets may have a different size. The buckets are initialized as a free pool of buckets maintained by the filter driver 90.

Read Operations

Figure 6:
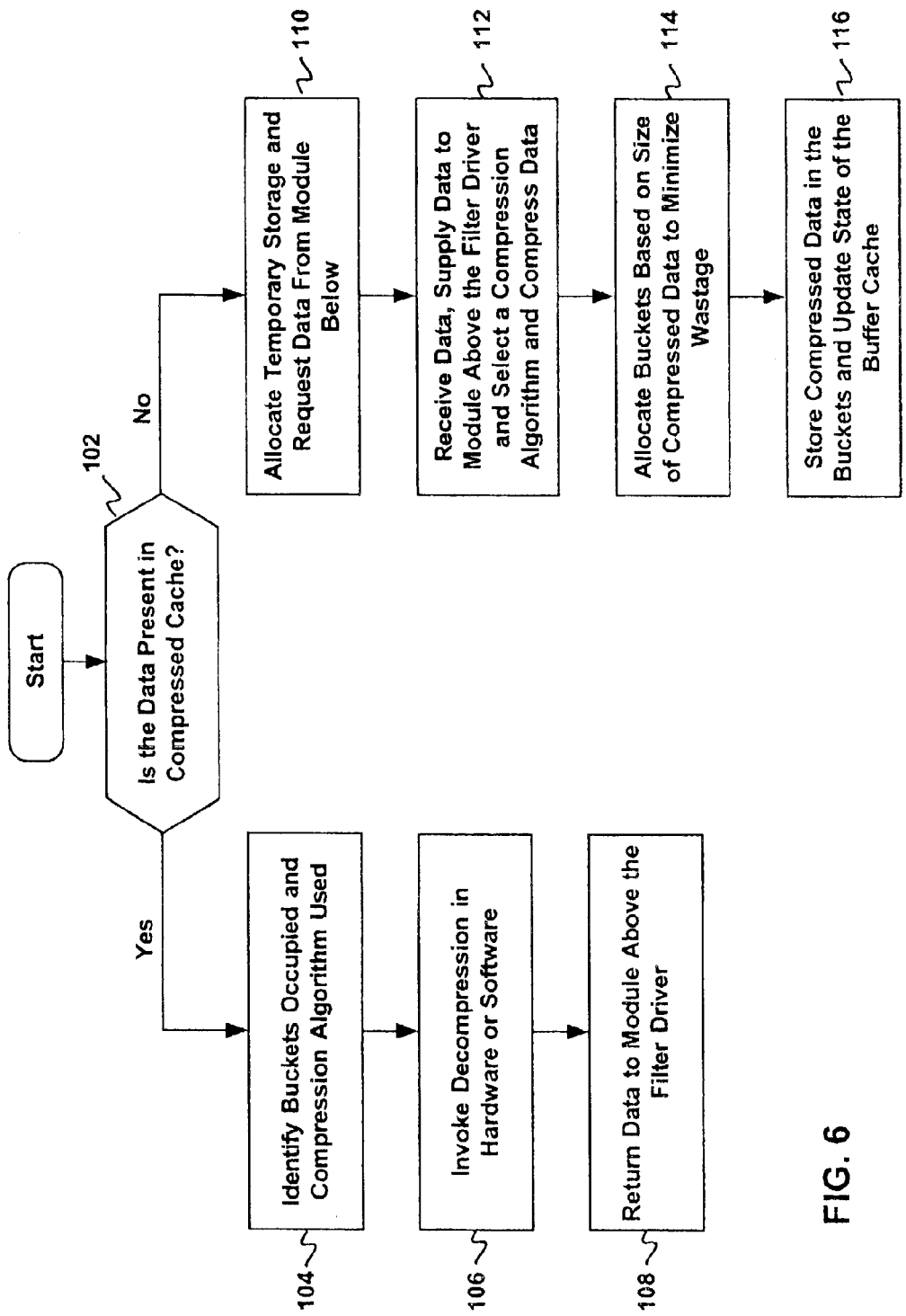
FIG. 6 is a flow diagram illustrating a read operation carried out by a filter driver of the computer system FIG. 3 according to an embodiment of the present invention.

Referring to FIG. 6, therein is shown a flow diagram illustrating a read operation carried out by the filter driver 90 of the computer system 60.

When the OS 31 invokes a read operation, the filter driver 90 checks to determine if the required data blocks are present in the compressed cache 76 at a step 102.

If the required data blocks are present in the compressed cache 76 in a compressed form, the filter driver 90 identifies the buckets (80-1 through 80-j) occupied by the data blocks and the compression algorithm used at a step 104.

The filter driver 90 calls the compression algorithm and decompresses the data blocks at a step 106. The decompression can be implemented in hardware and/or software.

The uncompressed data blocks are then returned to the layer above the filter driver 90 at a step 108.

If the required data blocks are not present, the filter driver 90 allocates temporary storage and invokes the software module positioned one layer below it to complete the read operation by accessing the persistent storage device 20 at a step 110.

After the software module positioned one layer below the filter driver 90 receives the required data blocks, it supplies the required data blocks to the filter driver 90. The filter driver 90 supplies the data to the layer above the filter driver 90. A compression algorithm is selected, and the required data blocks are compressed at step 112. To fully utilize computer resources, the compression of the data blocks is preferably done during an idle period. An idle period is a period of time when there is low utilization of the processor 12. For example, when a program, which runs on the computer system 60, is waiting for data to come back from the persistent storage device 20, there will be low utilization of the processor 12. It is advantageous to perform data compression during the idle period as it makes use of the computer resources when the utilization of the processor 12 is low.

The output of the compression algorithm can take variable amount of space depending on the compressibility of the data blocks at a step 114. The output of the compression algorithm is sent to one or more buckets. Most likely the last bucket used will not be completely full. This wastage will be repeated to varying degree each time data blocks are compressed. To minimize this wastage, an embodiment of the present invention allocates buckets with different sizes (lengths) based on the size (length) of compressed data. When the output of the compression algorithm is stored, the bucket selection algorithm identifies the buckets to be used to minimize wastage.

At a step 116, the compressed data is stored in the buckets and the state of the buffer cache 74 is updated.

Write Operations

Figure 7:
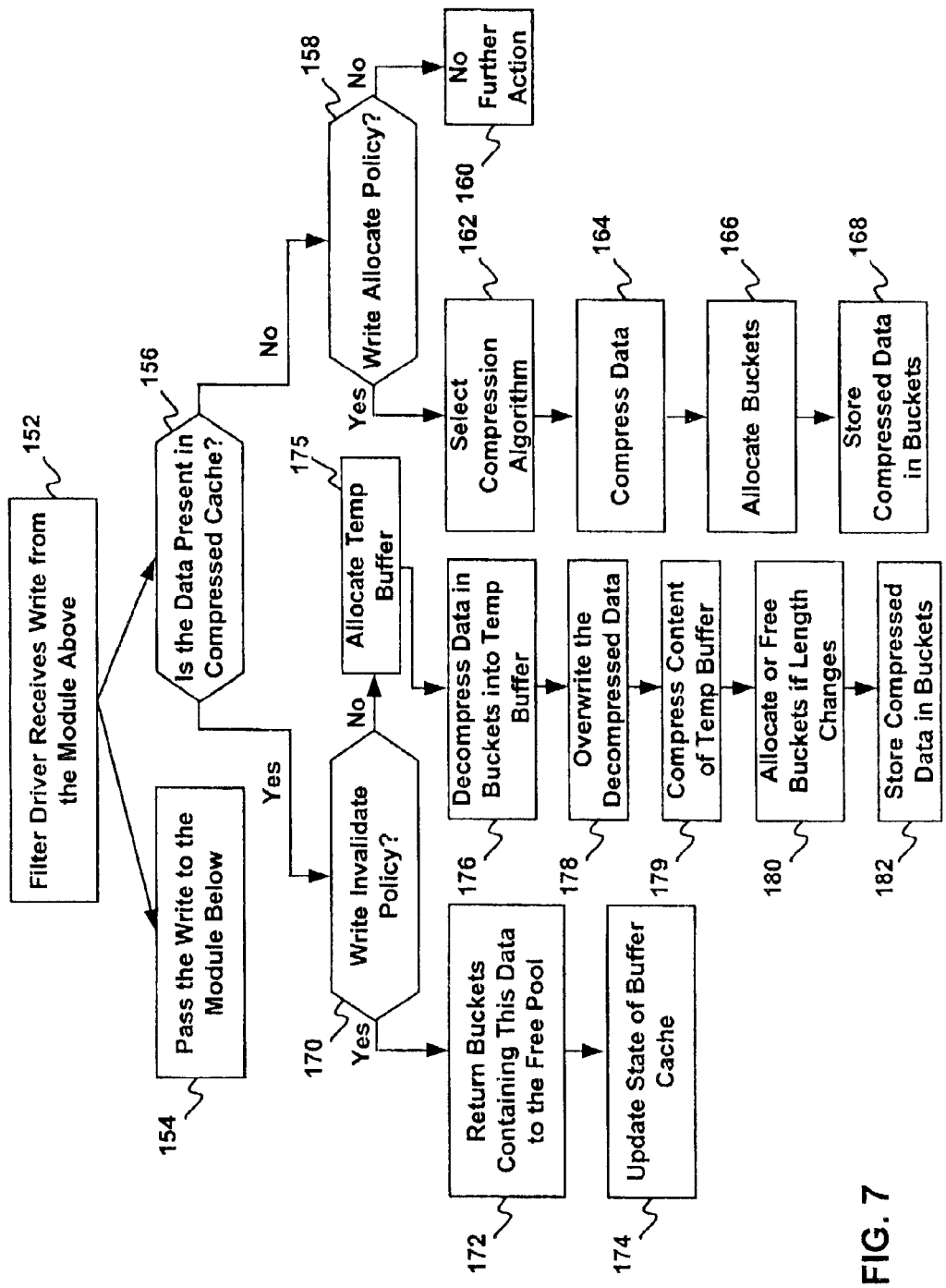
FIG. 7 is a flow diagram illustrating a write operation carried out by a filter driver of the computer system FIG. 3 according to an embodiment of the present invention.

Referring to FIG. 7, therein is shown a flow diagram illustrating a write operation carried out by the filter driver 90 of the computer system 60.

When the OS 31 invokes a write operation, the filter driver 90 receives a "write" instruction from the software module above it at a step 152.

The write instruction is then directly passed to the software module below the filter driver 90 at a step 154. This is to ensure that the data is actually sent to the persistent storage device 20.

If the required data blocks are not present in the compressed cache 76 (a step 156) and if a write allocation policy is not activated (a step 158), no further action will be taken at a step 160. The write allocation policy determines whether a write operation should be held in the compressed cache 76 if the required data blocks are not already present in the compressed cache 76.

If the required data blocks are not present in the compressed cache 76 (the step 156) and if the write allocation policy is activated (the step 158), then a compression algorithm appropriate for the data is selected at a step 162. The data is then compressed at a step 164. After the data is compressed, buckets are allocated based on the size (length) of the data at a step 166. The compressed data is then stored in the allocated buckets at a step 168.

If the required data blocks are already present in the compressed cache 76 as determined at the step 156, it must then determine whether a write invalidate policy will be followed at step 170. The write invalidate policy determines whether a "write" should invalidate (erase) the contents of the compressed cache 76.

If the write invalidate policy is followed, the buckets containing the data are freed up at a step 172 and the state of the buffer cache 74 is updated accordingly at a step 174.

If the required data blocks are already present in the compressed cache 76 in a compressed form as determined at the step 156, and if the write invalidate policy is not to be followed as determined at the step 170, the temporary buffer 78 is allocated at a step 175.

The compressed data contained in the buckets in the compressed cache 76 is uncompressed and then written into the temporary buffer 78 at a step 176. The temporary buffer 78 is a buffer in the main memory 68 for temporarily holding the uncompressed data during this algorithm of the write operation.

If the data coming in at the step 152 completely overwrites the temporary buffer 78, the step 176, which involves the decompression of data will be skipped.

It should be noted that the state for the buffer cache 74 indicates the range of data blocks that are in the buckets. If the range of the data blocks required in the write operation matches exactly the range of data blocks that are in the buckets, decompression is not required.

To the extent that the data coming in at the step 152 shares buckets with any portion of the uncompressed data, the data coming in at the step 152 will overwrite such portion of the uncompressed data at a step 178.

After the new data is written into the temporary buffer 78, it must be compressed again at a step 179.

Based on the size (or length) difference of the newly compressed and the compressed data, some buckets might have to be allocated or freed at a step 180.

The newly compressed data is then stored in the buckets and the state of the buffer cache 74 is updated at a step 182.

It should be noted that the path involving the steps 162 through 168 is desirable when write operations are not frequent since further read operations will find data in the compressed cache 76. However, the disadvantage of this path is that the steps 162 through 168 consume CPU cycles, i.e., incur overhead.

The path involving the step 160 is desirable when write operations are frequent since there is no overhead incurred because the steps 162 through 168 are avoided. However, the disadvantage of this path is that future read operations will miss in the compressed cache 76 and will require access to persistent storage device.

Similarly, the path involving the steps 175 through 182 is desirable when write operations are not frequent since further read operations will find data in the compressed cache 76. However, the disadvantage of this path is that the steps 175 through 182 consume CPU cycles, i.e., incur overhead.

Also, the path involving the steps 172 through 174 is desirable when write operations are frequent since there is no overhead incurred because the steps 175 through 182 are avoided. However, the disadvantage of this path is that future read operations will miss in the compressed cache 76 and will require access to persistent storage device.

The different paths can be preset or monitored so as to change with the frequency of write operations to optimize operation.

Since the optimum choice of compression algorithm will be different based on the data being compressed, the filter driver 90 according to an embodiment of the present invention provides a choice of compression algorithms. At runtime, the type of data is detected and a compression algorithm is selected. For each sequence of data blocks compressed as a unit, the module maintains, in addition to the identity of the buckets used and the range of data blocks compressed, the choice of compression algorithm. On subsequent reads to the same data blocks, the corresponding decompression algorithm is selected.

Another optimization in one of the embodiments is to initially compress only a fraction of any data blocks read from the persistent storage device 20. Based on the compressibility, a prediction is made on the size of the entire compressed data. Using the prediction, three scenarios are possible. First, compression is continued for the rest of the data blocks. In this case, the compressed data is stored in the compressed cache 76. Second, compression is aborted, and the data blocks read are stored in the compressed cache 76 in the uncompressed form. Third, compression is aborted, and the data is not stored in the compressed cache 76.

In another embodiment, a counter is set up to record the number of times a policy, e.g., the write invalidation policy, is applied to a given piece of data. If the counter's record reached a certain threshold value, the policy may be switch from an activated state to a non-activated state, or vice versa.

The filter driver 90 is responsible for managing the memory capacity (space) of the compressed cache 76. When the compressed cache 76 is full, the filter driver 90 must free up an adequate number of buckets to accommodate the output of the compression algorithm. It does that by evicting some of the blocks currently present based on policies such as least-recently-used or least-frequently-used based on configuration parameters. Also, based on the configuration parameters, the filter driver 90 can request the OS 31 to allocate more memory capacity to the compressed cache 76 to increase the size of the compressed cache 76. The filter driver 90 may also shrink the compressed cache 76 by returning unneeded memory capacity to the OS 31. Since the ultimate aim is to reduce time spent in accessing the persistent storage device 20, the filter driver 90 monitors the rate at which read operations are sent to it and adjusts the size of the compressed cache 76 to keep this rate low.

Accordingly, an embodiment of the present invention uses a layered software module known as a filter driver to implement a compressed cache for data from persistent storage devices. The present invention does not require any knowledge of compression to be built into the OS, nor does it require support from the persistent storage devices or their software drivers. The present invention is flexible as it does not preclude the use of new compression algorithms, implemented in either hardware or software. Thus the present invention is suitable for all modern operation systems such as Windows NT and its variants, and different flavors of UNIX such as HP-UX and Linux. The compressed cache described herein could also be used to completely replace the original buffer cache (or reduce it in size significantly) since it hides accesses to persistent storage devices more effectively.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations that fall within the spirit and scope of the included claims. All matters hitherto-fore set forth herein or shown in the accompanying drawings are to be interpreted in an illustrative and non-limiting sense.

What is claimed is:

1. A method for memory operation in a computer system, comprising:
   compressing data into one of a plurality of fixed size units in main memory;
   determining when compressed data is present in non-persistent memory and:
      decompressing the compressed data as decompressed data, and
      providing the decompressed data from the non-persistent memory for processing; and
   determining when the compressed data is not present in the non-persistent memory and:
      providing uncompressed data from the persistent memory for processing.

2. The method as claimed in claim 1 comprising:
   determining when the compressed data is not present in the non-persistent memory and:
      compressing the uncompressed data from the persistent memory to form new compressed data, and
      storing the new compressed data in the non-persistent memory.

3. The method as claimed in claim 1 comprising:
   determining when the compressed data is not present in the non-persistent memory and, during an idle period of the computer system:
      compressing the uncompressed data from the persistent memory to form new compressed data,
      allocating a bucket having a variable size related to the size of the new compressed data, and
      storing the new compressed data in the bucket in the non-persistent memory.

4. The method as claimed in claim 1 comprising:
   providing uncompressed data in a memory selected from a group consisting of a processor cache, virtual memory, and a combination thereof;
   determining when the compressed data is nor present in the non-persistent memory with a write allocation policy in effect and:
      compressing the uncompressed data from the memory to form new compressed data,
      allocating a bucket having a variable size related to the size of the new compressed data, and
      storing the new compressed data in the bucket in the non-persistent memory.

5. The method as claimed in claim 1 comprising:
   determining when the compressed data is present in the non-persistent memory with a write invalidate policy in effect and:
      freeing the compressed data in the non-persistent memory.

6. A method for memory operation in a computer system, comprising:
   compressing data into one of a plurality of fixed size buckets in a compressed cache;
   determining when compressed data is present in the compressed cache and:
      identifying the buckets occupied by the compressed data and compression algorithm used to compress the compressed data,
      maintaining an identity of the buckets, a range of the compressed data, and the compression algorithm used,
      decompressing the compressed data as decompressed data, and
      providing the decompressed data from the compressed cache for processing; and
   determining when the compressed data is not present in the compressed cache and:
      providing uncompressed data from the persistent memory for processing.

7. The method as claimed in claim 6 comprising:
   determining when the compressed data is not present in the compressed cache and:
      selecting a compression algorithm after receiving the uncompressed data from the persistent memory,
      predicting a size of the uncompressed data as new compressed data, and
      processing the uncompressed data based on the predicted size by processing from a group consisting of compressing the uncompressed data to form the new compressed data and storing, the new compressed data in a compressed cache, storing the uncompressed data in the compressed cache without compression, storing the uncompressed data in a buffer cache without compression, and a combination.

8. The method as claimed in claim 6 comprising:
   determining when the compressed data is not present in the compressed cache and selecting a compression algorithm after receiving the uncompressed data from the persistent memory.
      predicting a size of the uncompressed data as new compressed data based on the compression algorithm, and
      processing the uncompressed data during am idle period of the computer system based on the predicted size by processing from a group consisting of compressing the uncompressed data to form the new compressed data and storing the new compressed data in a compressed cache, scoring the uncompressed data in the compressed cache without compression, storing the uncompressed data in a buffer cache without compression, and a combination thereof.

9. The method as claimed in claim 6 comprising:
   determining when the compressed data is not present in the compressed cache with a write allocation policy in effect and:

selecting a compression algorithm appropriate for the uncompressed data,
compressing the uncompressed data,
allocating buckets in the compressed cache based on a size of the compressed data, and
storing the compressed data in the allocated buckets; and
determining when the compressed data is not present in the compressed cache with a write allocation policy not in effect.

10. The method as claimed in claim 6 comprising:
determining when the compressed data is present in the compressed cache with a write invalidate policy in effect and:
freeing the compressed data in a bucket in the compressed cache; and
determining when the compressed data is present in the compressed cache with the write invalidate policy not in effect and:
decompressing the compressed data contained in the bucket in the compressed cache to form uncompressed data,
writing the uncompressed data into a decompression buffer,
compressing the decompressed data to form new compressed data,
allocating or freeing buckets based on a difference in length of the new compressed data and the compressed data, and
storing the new compressed data in the bucket in the compressed cache.

11. A computer system comprising:
a processor,
a persistent storage device;
a main memory connected to the processor and the persistent storage device, the main memory including:
a compressed cache for storing data retrieved from the persistent storage device after compression in one of a plurality of fixed size units in the main memory; and
an operating system including:
a plurality of software modules for accessing the persistent storage device, the plurality of software modules interconnected, and
a filter driver for managing memory capacity of the compressed cache, the filter driver interconnected between two of the plurality of software modules.

12. The computer system as claimed in claim 11 including:
an interface connected to the filter driver for transparently conducting operations between the two of the plurality of the software modules.

13. The computer system as claimed in claim 11 wherein:
the main memory includes a buffer cache connected to the compressed cache for storing data retrieved from the persistent storage device without compression.

14. The computer system as claimed in claim 11 wherein the plurality of software modules includes:
a system call interface module;
a file system module connected to the system call interface module;
a logical volume manager module connected to the file system module; and
a device driver module connected to the logical volume manager module.

15. The computer system as claimed in claim 11 wherein:
the filter driver is configured to cause the operating system to allocate memory capacity between the compressed cache and the buffer cache.

16. The computer system as claimed in claim 11 wherein the compressed cache includes:
a first plurality of buckets, each of the first plurality of buckets includes a memory space of m bytes; and
a second plurality of buckets, each of the second plurality of buckets includes a memory space of n bytes wherein m arid a are integers and in is not equal to n.

17. The computer system as claimed in claim 15 wherein:
the filter driver is configured to free the first plurality of buckets and the second plurality of buckets based on a free-up policy.

18. A computer system comprising:
a processor;
a persistent storage device;
a main memory connected to the processor and the persistent storage device, the main memory including:
a compressed cache for storing uncompressed data retrieved from the persistent storage device as compressed data in one of a plurality of fixed size buckets, and
a buffer cache connected to the compressed cache for storing uncompressed date retrieved from the persistent storage device as uncompressed data; and
an operating system including:
a plurality of software modules for accessing the persistent storage device, the plurality of software modules being organized in a multi-layer structure, and
a filter driver for managing memory capacity of the compressed cache, the filter driver interconnected between two of the plurality of software modules.

19. The computer system as claimed in claim 18 including:
an interface connected to the filter driver for transparently conducting operations between the two of the plurality of the software modules for the filter driver.

20. The computer system as claimed in claim 18 wherein:
the main memory includes a virtual memory for storing computer programs during execution by the operating system.

21. The computer system as claimed in claim 18 wherein the plurality of software modules includes:
a system call interface module;
a file system module connected to the system call interface module;
a logical volume manager module connected to the file system module; and
a device driver module connected to the logical volume manager module.

22. The computer system as claimed in claim 18 wherein:
the filter driver is configured to cause the operating system to allocate additional memory capacity for the compressed cache from the buffer cache and to return unneeded memory capacity to the buffer cache.

23. The computer system as claimed in claim 18 wherein the compressed cache includes:
a first plurality of buckets, each of the first plurality of buckets includes a memory space of m bytes; and
a second plurality of buckets, each of the second plurality of buckets includes a memory space of n bytes wherein m and n are integers and m is not equal to n.

24. The computer system as claimed in claim 23 wherein:
the filter driver is configured to free up the first plurality of buckets and the second plurality of buckets based on policies selected from a group consisting of least-recently-used least-frequently-used, and a combination thereof.

* * * * *